ARITHMETIC ELEMENT FOR DIGITAL COMPUTERS

Filed Jan. 14, 1958 5 Sheets-Sheet 1

INVENTORS
HERMAN JACOB HEIJN
JOHAN CORNELIS SELMAN
BY
Frank R. Jifari
AGENT

ARITHMETIC ELEMENT FOR DIGITAL COMPUTERS

Filed Jan. 14, 1958

INVENTORS
HERMAN JACOB HEIJN
JOHAN CORNELIS SELMAN
BY
Frank R. Jifani
AGENT

ARITHMETIC ELEMENT FOR DIGITAL COMPUTERS

Filed Jan. 14, 1958 5 Sheets-Sheet 3

INVENTORS
H. J. HEIJN
J. C. SELMAN
Frank R. Jefferi[illegible]
AGENT

ARITHMETIC ELEMENT FOR DIGITAL COMPUTERS

Filed Jan. 14, 1958 5 Sheets-Sheet 4

INVENTORS
HERMAN JACOB HEIJN
JOHAN CORNELIS SELMAN
BY
Frank R. Jeifari
AGENT

ARITHMETIC ELEMENT FOR DIGITAL COMPUTERS

Filed Jan. 14, 1958 5 Sheets-Sheet 5

INVENTORS
HERMAN JACOB HEIJN
JOHAN CORNELIS SELMAN
BY Frank R. Jeifari
AGENT

United States Patent Office 3,056,551
Patented Oct. 2, 1962

3,056,551

ARITHMETIC ELEMENT FOR DIGITAL COMPUTERS

Herman Jacob Heijn and Johan Cornelis Selman, Eindhoven, Netherlands, assignors to North American Philips Company Inc., New York, N.Y., a corporation of Delaware Filed Jan. 14, 1958, Ser. No. 708,917
Claims priority, application Netherlands Jan. 22, 1957
4 Claims. (Cl. 235—175)

This invention relates to arithmetic elements built up of gates for digital computers, which receive direct or indirect information about the digits of a plurality of numbers (operands) and which convert this information into information about the digits of the result of an arithmetical operation performed on the operands, the arithmetic element being subdivided into a plurality of sections each corresponding to a single digit place or to a plurality of sequential digit-places of the operands and of the result. An object of the invention is to provide an arithmetic element which is faster in operation than that which may be constructed with known means. It is known that the elementary arithmetical operations such as addition, subtraction, multiplication, etc., may be reduced directly or indirectly to the operation of addition. The arithmetic element of substantially all fast digital computers of known type thus is essentially a member performing additions in accordance with instructions given thereto. However, the present invention is independent of the kind of operation to be carried out and is also independent of the numerical system in which the operation is effected. For this reason, the computing member and more particularly that part thereof which carries out the operation concerned will be referred to in this specification as the arithmetic element.

If, when considering a simple case, two numbers $x$ and $y$ are to be added, each digit of the sum $z$ of these two numbers depends not only upon the digits in the same digit place of the numbers $x$ and $y$, but also upon the carry resulting from the addition of the digits in the preceding digit place of the numbers $x$ and $y$, the latter in turn being dependent inter alia upon the carry resulting from the addition of the digits in the next preceding digit place of the numbers $x$ and $y$, etc. Thus, it seems that the addition of two numbers is essentially a series process, because of the handling of the carries. The present invention underlies recognition of the fact that this assertion, which may be found in all professional literature, is not entirely correct and that the information about each digit of the sum may be produced independently of preceding carries at a rate equal to that at which, in each digit place $i$, the corresponding digit $z_i$ of the sum is produced from the relevant digits $x_i$ and $y_i$ of the numebrs $x$ and $y$ and the carry $c_{-i-1,\ i}$, resulting from the addition in the preceding digit-place $i-1$. Consequently, in an adder having $n$ digit-places, this can result in a maximum of an $n$-fold increase in computing rate.

In many cases, this increase in computing rate of the arithmetic element cannot be utilized completely, since the arithmetic element in this case computes at a considerably higher rate than that at which information about the operands may be fed thereto, so that after each calculation of a result, the arithmetic element necessarily must wait a period of time before it receives information about the next calculation. In many cases, it is preferable for the computing rate of the arithmetic element to be chosen approximately equal to the maximum rate at which information about the operands can be fed to the arithmetic element. In these cases, it is preferable for each section of the arithmetic element to correspond to two or more digit places and the carries to propagate in the sections themselves in known manner, the information about the input carry of each section being produced independently of preceding carries, or at the most through a small portion of these preceding carries. Accordingly to the invention, the optimum form of the object aimed at is therefore achieved by designing the sections of the arithmetic element so that the maximum number of gates through which the information about the digits of the result is produced which correspond to the ends of the sections, are substantially equal for all sections; it will be evident that the rate at which a certain information is produced is directly proportional to the maximum number of gates through which such information is produced. On the other hand, the computing rate of the arithmetic element as a whole is equal to the rate at which the slowest digit of the result is produced, the latter being ipso quo a digit at the end of a section. If the information about one of these digits is produced at a considerably lower rate than the information about the other end digits, this implies that this section has been made too long. If, however, the information about one of the end digits is produced at a considerably higher rate than the information about the other end digits this implies that the section has been made too short.

The term "logical circuit" is to be understood hereinafter to means a circuit producing output information from one or more kinds of input information (which is usually of the yes-no-type, but need not necessarily be so). The simplest logical circuits are inverting gates, and-gates and or-gates, which are indicated in the figures by the characters I, A, O and may be realised in known manner by means of tubes, crystal diodes, relays and, if desired, even purely mechanical members. These gates may handle information of the yes-no-type and provide information of the same type. Each of the two last-mentioned kinds of gates can be built up from the two others. By using Boolean algebraic considerations or generalisations thereof, it appears that each logical circuit may be built up from gates in an infinite number of ways.

The term "indirect information" about a number of variables $x, y, z \ldots$ is to be understood in this case to mean a Boolean function $f(x, y, z \ldots)$ of these variables. For each Boolean function, there may be given an infinite number of equivalent expressions each corresponding to a determined circuit of inverting gates, and-gates and or-gates.

In order that the invention may be more readily carried into effect, several embodiments of a binary adder according thereto will now be explained more fully, by way of example, with reference to the accompanying drawings.

Figure 1:
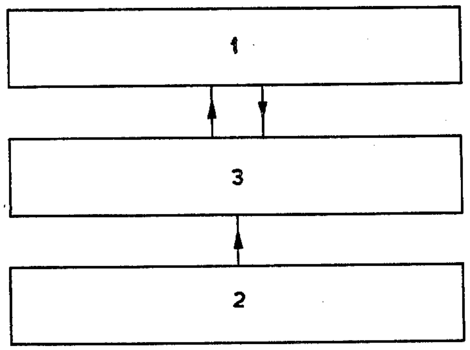
FIG. 1 shows the general diagram of an arithmetic element of a numerical computer.

In the figures, reference numerals 1 and 2 indicate two registers in which numbers $x$ and $y$ may be registered, and reference numeral 3 indicates an arithmetic element. The latter receives information from the registers 1 and 2 and produces the result $z$ of the arithmetical operation performed on the numbers or operands $x$ and $y$. This is represented by arrows directed from the registers to the arithmetic element. From the moment when the information about the result $z$ is completely present in the arithmetic element, the result may be transferred to a member, preferably the register 1, of the computer. This transfer of the number present in the arithmetic element is effected by the action of a control pulse which is supplied with a constant recurrence period T by a pulse generator associated with the computer. This recurrence period T must be greater than the greatest time-interval needed by the arithmetic element for producing the result. The lower limit thus set to the recurrence period frequently lies, for computers having many digit places, considerably above the lower limit of the period with which the digits in the registers 1 and 2 can be varied, so that the computing rate of the computer may be increased by increasing the computing rate of the arithmetic element.

Figure 2:
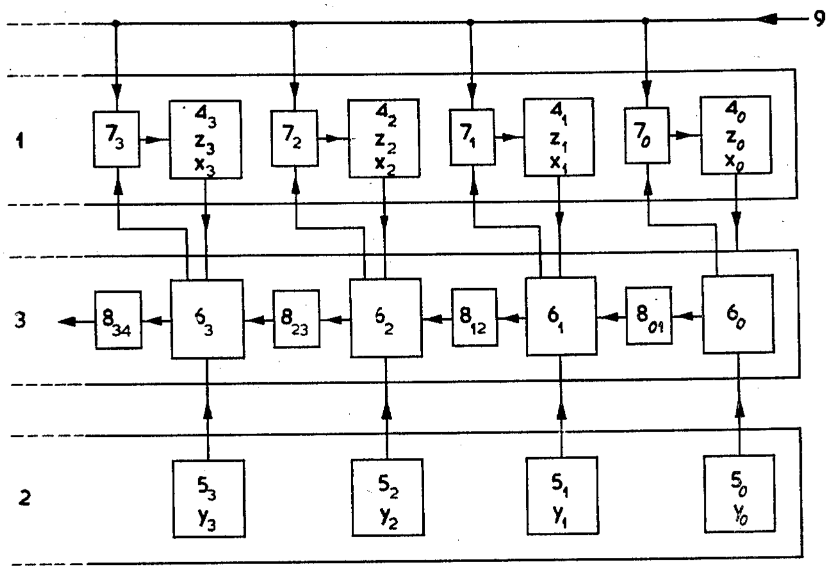
FIG. 2 shows a more detailed diagram of such an arithmetic element.

FIG. 2 shows in greater detail an arithmetic element for performing additions. The registers 1 and 2 comprise bistable members $4_0$, $4_1$, $4_2$ . . . $5_0$, $5_1$, $5_2$ . . . corresponding to the digit places of the operands $x$ and $y$. Each stable condition of the members $4_i$, $5_i$ corresponds to a digit (0 and 1 in the binary system) in a given digit place. The arithmetic element 3, in this case the adder, comprises a plurality of elementary full-adders $6_0$, $6_1$, $6_2$ . . . and carry producers $8_{01}$, $8_{12}$, $8_{23}$, . . . placed between them, which together perform the addition operation in a manner which will be described hereinafter. Finally, the register 1 comprises a plurality of control circuits, $7_0$, $7_1$, $7_2$ . . . Each elementary full-adder $6_i$ receives information from the bistable circuits $4_i$, $5_i$ in the same digit place and from the preceding carry producer $8_{i-1,\ i}$ (except the first elementary full-adder $6_0$, which is not preceded by a carry producer). Each elementary full-adder $6_i$ supplies information to the control member $7_i$ in the same digit place and to the subsequent carry produced $8_{i,\ i+1}$ (except the last elementary full-adder $6_n$ which is not followed by a carry producer). Thus, each group of members $4_i$, $5_i$, $6_i$, $7_i$ corresponds to a digit place: $4_0$, $5_0$, $6_0$, $7_0$ correspond to the units or $g^0$-members, that is to say the digit place 0; $4_1$, $5_1$, $6_1$, $7_1$ correspond to the $g^1$-numbers, that is to say the digit place 1, etc.

Each carry producer $8_{i-1,\ i}$ receives information (in FIG. 2 through the preceding elementary full-adder $6_{i-1}$) from the preceding bistable circuits $4_{i-1}$, $5_{i-1}$ and from the next preceding carry producer $8_{i-2,\ i-1}$ (except the first carry producer $8_{01}$, which is not preceded by a carry producer). Each carry producer supplies information to the subsequent elementary full-adder $6_i$ and (in FIG. 2 through the elementary full-adder $6_i$) to the subsequent carry producer (except the last carry producer $8_{n-1,\ n}$, which is not followed by a carry producer). As will be explained more fully hereinafter, the elementary full-adders and carry producers may also receive indirect information about the digits $x_i$, $y_i$ of the numbers $x$ and $y$.

The numerical arithmetic element shown in FIG. 2 operates as follows: "The two numbers to be added . . . $x_2x_1x_0$ and . . . $y_2y_1y_0$ (in the binary system the numbers $$x=x_0+2x_1+2^2x_2+ \ldots$$

and $y=y_0+2y_1+2^2y_2+ \ldots$) are registered in the registers 1 and 2 in a manner which is immaterial for the operation of the arithmetic element, that is to say the circuit $4_0$ is brought into the condition corresponding to the digit $x_0$, the circuit $5_0$ into the condition corresponding to the digit $y_0$, etc. Information about the conditions of the circuits $4_0$, $4_1$, $4_2$ . . . $5_0$, $5_1$, $5_2$ . . . is led to the elementary full-adders $6_0$, $6_1$, $6_2$ . . . for example in the form of voltages. Now, in the elementary full-adder $6_0$, information is produced about the first digit $$z_0=x_0+y_0$$

of the sum $z$ and in the carry producer $8_{01}$ information is produced about the carry $c_{01}$ resulting from this addition. Subsequently, in the elementary full-adder $6_1$, information is produced about the second digit $z_1=x_1+y_1+c_{01}$ of the sum $z$, and in the carry producer $8_{12}$ information is produced about the carry $c_{12}$ resulting from this addition. Then, in the elementary full-adder $6_2$, information is produced about the third digit $z_2=x_2+y_2+c_{12}$ of the sum $z$ and in the carry producer $8_{23}$ information is produced about the carry $c_{23}$ resulting from this addition. This process continues in an analogous manner until information about all figures $z_0$, $z_1$, $z_2$ . . . of the sum $z=x+y$ is available. Subsequently, a control pulse is led, through a conductor 9, simultaneously to all control circuits $7_0$, $7_1$, $7_2$ . . ., with the result that the information available about the digits $z_0$, $z_1$, $z_2$ . . . is transferred to the circuits $4_0$, $4_1$, $4_2$ . . . and these circuits assume the conditions corresponding to said figures. If desired, the computer may comprise control circuits causing the sum $z$ to be transferred to a member other than the register 1, for example a main memory or an auxiliary memory. From the foregoing, it readily appears that the addition performed by this adder is a series-operation, that is to say the operation takes place digit after digit. Registering a number in a register may be effected, but not necessarily so, as a simultaneous operation, that is to say all digits may be registered simultaneously in the register. Assuming now that:

$T_1$=minimum time interval in which the circuits $4_i$, $5_i$ may be changed completely from a stable condition to another stable condition;

$T_2$=minimum time interval in which the members $4_i$, $5_i$, after the occurrence of a control pulse, can supply information about the new stable condition;

$T_3$=minimum time interval in which each of the logical circuits $6_i$, $8_{i-1,\ i}$, after receipt of input information, can supply an output information.

If the computing member has $n$ digit places, it is necessary that $$T \geqq \max.\ (T_1,\ T_2+nT_3) \qquad (1)$$

where T is the recurrence period.

This does not means that each sum is present in the arithmetic element 3 only a time interval $T_2+nT_3$ after the occurrence of a control pulse, since each adder and carry producer becomes operative immediately upon receipt of information, that is to say the adders and carry producers operate simultaneously when the digits of the numbers $x$ and $y$ are registered simultaneously in the registers 1 and 2 (which need not necessarily be the case). However, the output information of the adding element $6_1$, and of the carry producer $8_{12}$ may still vary if, at the moment $T_3$, information about the carry $c_{01}$ is received, the moment 0 being chosen as the moment when the information about all digits registered simultaneously in the registers 1 and 2 is available. The output information of adder $6_2$ and of carry producer $8_{23}$ may still vary if the information about the carry $c_{12}$, received from the preceding carry producer $8_{12}$, still varies at the moment $2T_3$, etc. In the most unfavourable cases (for example in the addition . . . 1111+ . . . 0001) the sum is present in the adder only a time interval $nT_3$ after information about digits $x_0$, $x_1$, $x_2$, . . . $y_0$, $y_1$, $y_2$, . . . becomes available simultaneously. For high values of $n$, the computing rate of the adder is thus limited by the condition $T \geqq T_2+nT_3$. This is a disadvantage, as may appear from the fact that this time interval is required only rarely. Considered statistically, arbitrary additions of binary numbers of forty figures require an average time interval $4.6T_3$ for producing the sum of two numbers $x$ and $y$ in the adder, so that a considerable decrease in computing rate is necessary for additions which occur only rarely.

Figure 3:
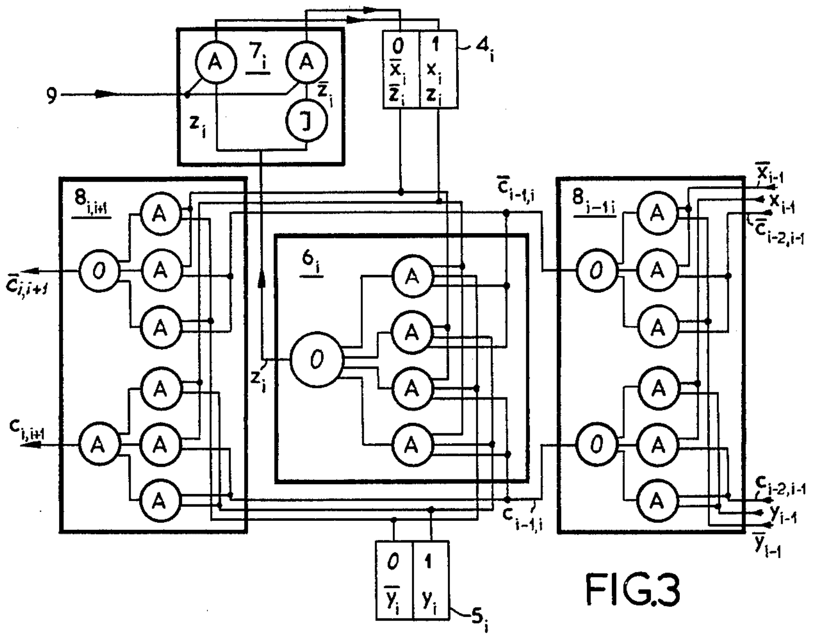
FIG. 3 shows a diagram of some details of the arithmetic element member of FIG. 2.

FIG. 3 shows a possible embodiment of the members $4_i$, $5_i$, $6_i$, $7_i$, $8_{i-1,\,i}$. The circuit $6_i$ realizes the Boolean expression:

$$z_i = x_i\bar{y}_i\bar{c}_{i-1,\,i} + \bar{x}_i y_i \bar{c}_{i-1,\,i} + \bar{x}_i\bar{y}_i c_{i-1,\,i} + x_i y_i c_{i-1,\,i} \quad (2)$$

and the circuit $8_{i-1,\,i}$ realizes the two Boolean expressions:

$$c_{i-1,\,i} = x_{i-1}y_{i-1} + x_{i-1}c_{i-2,\,i-1} + y_{i-1}c_{i-2,\,i-1} \quad (3)$$

$$\bar{c}_{i-1,\,i} = \bar{x}_{i-1}\bar{y}_{i-1} + \bar{x}_{i-1}\bar{c}_{i-2,\,i-1} + \bar{y}_{i-1}\bar{c}_{i-2,\,i-1} \quad (4)$$

wherein + signifies or, . signifies and, and a bar over a character indicates negation (non), whilst $x_i$ indicates that the $i$th digit of the number $x$ is equal to unity and $\bar{x}_i$ indicates that this digit is equal to 0. One arrives at the Formula 2 by finding that $z_i=1$ if either only one of the three digits $x_i$, $y_i$, $c_{i-1,\,i}$ has the value 1, or all three digits have the value 1. The Formula 3 expresses that $c_{i-1,\,i}=1$ if at least two of the three digits $x_{i-1}$, $y_{i-1}$, $c_{i-2,\,i-1}$ have the value 1 and the Formula 4 expresses that $c_{i-1,\,i}=0$ if at least two of the three digits have the value 0.

The logical circuits $6_i$, $8_{i-1,\,i}$ may be built up from and-gates A, or-gates O and, if desired, inverting gates I. FIG. 3 shows the structure of these circuits based directly upon the Expressions 2, 3, 4. Since each Boolean function may be expressed in its variables in numerous equivalent ways, many further embodiments of the elementary full-adder $6_i$, $8_{i-1,\,i}$ are possible. This remark of course applies to any logical member.

Figure 4:
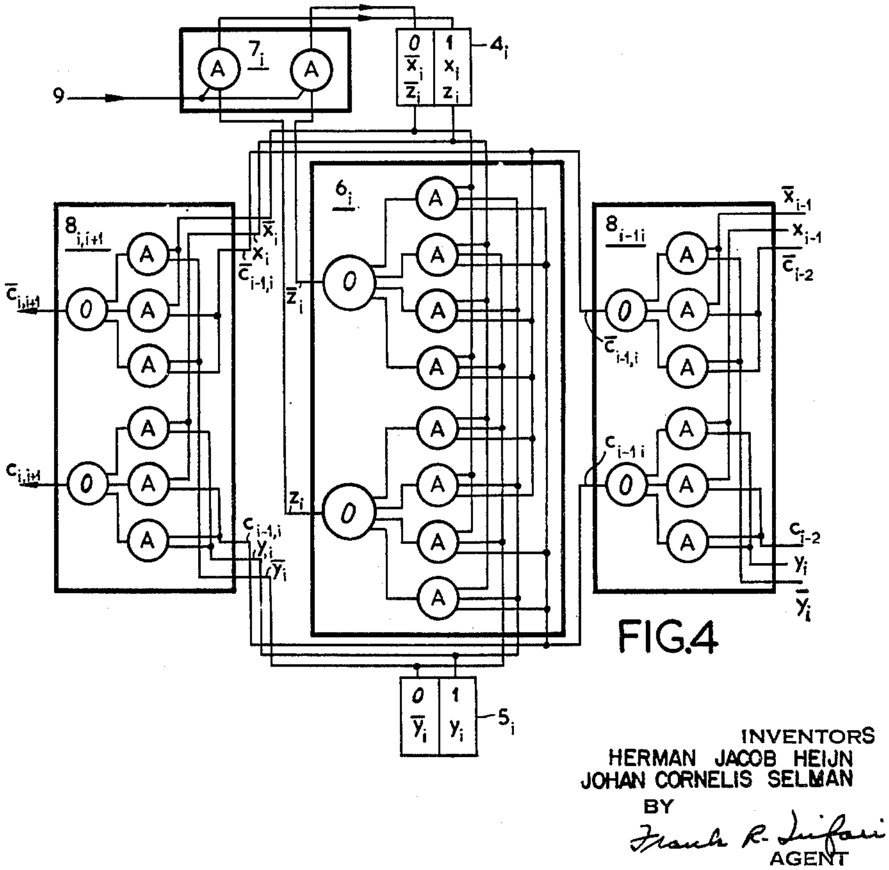
FIG. 4 shows the diagram of another embodiment of the same details.

The logical circuit $7_i$ may be built up in the described manner from two and-gates A and an inverting gate I as shown. The inverting gate may be omitted if in the circuit $6_i$, there is produced not only the information $z_i$, but also the information $$\bar{z}_i = \bar{x}_i y_i c_{i-1,\,i} + x_i\bar{y}_i c_{i-1,\,i} + x_i y_i \bar{c}_{i-1,\,i} + \bar{x}_i\bar{y}_i\bar{c}_{i-1,\,i} \quad (5)$$

similarly as in the carry producer $8_{i-1,\,i}$, there is produced not only the information $c_{i-1,\,i}$ but also the information $\bar{c}_{i-1,\,i}$. This circuit arrangement is shown in FIG. 4.

When writing the Formulas 3, 4 for successively $i=0, 1, 2, 3 \ldots$ and assuming $c_{-1,0}=0_2 0_{-1,0}=1$ then we have $$\begin{aligned} c_{01} &= x_0 y_0 \\ c_{12} &= x_1 y_1 + (x_1+y_1)c_{01} \quad (6) \\ c_{23} &= x_2 y_2 + (x_2+y_2)c_{12} \end{aligned}$$

$$\begin{aligned} \bar{c}_{01} &= \bar{x}_0 + \bar{y}_0 \\ \bar{c}_{12} &= \bar{x}_1\bar{y}_1 + (\bar{x}_1+\bar{y}_1)\bar{c}_{01} \quad (7) \\ \bar{c}_{23} &= \bar{x}_2\bar{y}_2 + (\bar{x}_2+\bar{y}_2)\bar{c}_{12} \end{aligned}$$

and in general.

$$\begin{aligned} c_{i-1,\,i} = {} & x_{i-1}y_{i-1} + (x_{i-1}+y_{i-1})x_{i-2}y_{i-2} \\ & + (x_{i-1}+y_{i-1})(x_{i-2}+y_{i-2})x_{i-3}y_{i-3} + \ldots \\ & + (x_{i-1}+y_{i-1})(x_{i-2}+y_{i-2}) \ldots (x_1+y_1)x_0 y_0 \quad (8) \end{aligned}$$

$$\begin{aligned} c_{i-1,\,i} = {} & \bar{x}_{i-1}\bar{y}_{i-1} + (\bar{x}_{i-1}+\bar{y}_{i-1})\bar{x}_{i-2}\bar{y}_{i-2} \\ & + (\bar{x}_{i-1}+\bar{y}_{i-1})(\bar{x}_{i-2}+\bar{y}_{i-2})\bar{x}_{i-3}\bar{y}_{i-3} + \ldots \\ & + (\bar{x}_{i-1}+\bar{y}_{i-1})(\bar{x}_{i-2}+\bar{y}_{i-2}) \ldots (\bar{x}_1+\bar{y}_1)(\bar{x}_0+\bar{x}_0) \end{aligned}$$

which formulas can be proved by induction. From the Formulas 2 and 8 it follows successively $$z_0 = (x_0\bar{y}_0 + \bar{x}_0 y_0)$$

$$\begin{aligned} z_1 = {} & (\bar{x}_0 x_1\bar{y}_1 + \bar{x}_0\bar{x}_1 y_1 + \bar{y}_0 x_1\bar{y}_1 + \bar{y}_0\bar{x}_1 y_1) \\ & + (x_0 y_0 x_1 y_1) + (x_0 y_0 \bar{x}_1\bar{y}_1) \end{aligned}$$

$$\begin{aligned} z_2 = {} & (x_1 y_1 x_2 y_2) + (x_1 y_1 \bar{x}_2\bar{y}_2) + (\bar{x}_1\bar{y}_1 x_2\bar{y}_2 + \bar{x}_1\bar{y}_1\bar{x}_2 y_2) \\ & + (\bar{x}_0\bar{x}_1 x_2\bar{y}_2 + \bar{x}_0\bar{x}_1\bar{x}_2 y_2 + \bar{x}_0\bar{y}_1 x_2\bar{y}_2 + \bar{x}_0\bar{y}_1\bar{x}_2 y_2 \\ & + \bar{y}_0\bar{x}_1\bar{x}_2\bar{y}_2 + \bar{y}_0\bar{x}_1\bar{x}_2 y_2 + \bar{y}_0\bar{y}_1 x_2\bar{y}_2 + \bar{y}_0\bar{y}_1\bar{x}_2 y_2) \\ & + (x_0 y_0 x_1 x_2 y_2 + x_0 y_0 y_1 x_2 y_2) + (x_0 y_0 x_1 \bar{x}_2\bar{y}_2 \\ & + x_0 y_0 y_1 \bar{x}_2\bar{y}_2) \quad (9) \end{aligned}$$

In the formulas, $x_i$ and $y_i$ may be interchanged for any value of $i$ occurring therein. The terms resulting from such interchanges are placed between brackets. Using the Formulas 9 and analogous formulas which may be developed for $z_0$, $z_1$, $z_2 \ldots$ it is possible to design an adder without carry producers, in which each digit $z_i$ is produced through two gates. This is the fastest adder that may be built up from gates, but this solution requires the use of a considerable number of gates and hence tubes, crystal diodes or relays.

An adder which is a little slower, but still considerably fast, is obtained by producing the information $z_i$ and $\bar{z}_i$ via the information $c_{i-1,\,i}$ and $\bar{c}_{i-1,\,i}$ and producing the last-mentioned information in turn via the information $d_i=x_i y_i$, $e_i=x_i+y_i$, $\bar{d}_i=\bar{x}_i+\bar{y}_i$, $\bar{e}_i=\bar{x}_i\bar{y}_i$. For this purpose, the Formulas 2, 5 and 8 are written in the form $$\begin{aligned} z_i &= x_i\bar{y}_i\bar{c}_{i-1,\,i} + \bar{x}_i y_i\bar{c}_{i-1,\,i} + \bar{e}_i c_{i-1,\,i} + d_i c_{i-1,\,i} \\ \bar{z}_i &= x_i y_i c_{i-1,\,i} + \bar{x}_i y_i c_{i-1,\,i} + \bar{e}_i\bar{c}_{i-1,\,i} + \bar{d}_i\bar{c}_{i-1,\,i} \quad (10) \end{aligned}$$

$$\begin{aligned} c_{i-1,\,i} = {} & d_{i-1} + e_{i-1}d_{i-2} + e_{i-1}e_{i-2}d_{i-3} + \ldots \\ & + e_{i-1}e_{i-2} \ldots e_1 d_0 \end{aligned}$$

$$\begin{aligned} \bar{c}_{i-1,\,i} = {} & \bar{e}_{i-1} + \bar{d}_{i-1}\bar{e}_{i-2} + \bar{d}_{i-1}\bar{d}_{i-2}\bar{e}_{i-3} \\ & + \ldots \bar{d}_{i-1}\bar{d}_{i-2} \ldots \bar{d}_1\bar{d}_0 \end{aligned}$$

Figure 5:
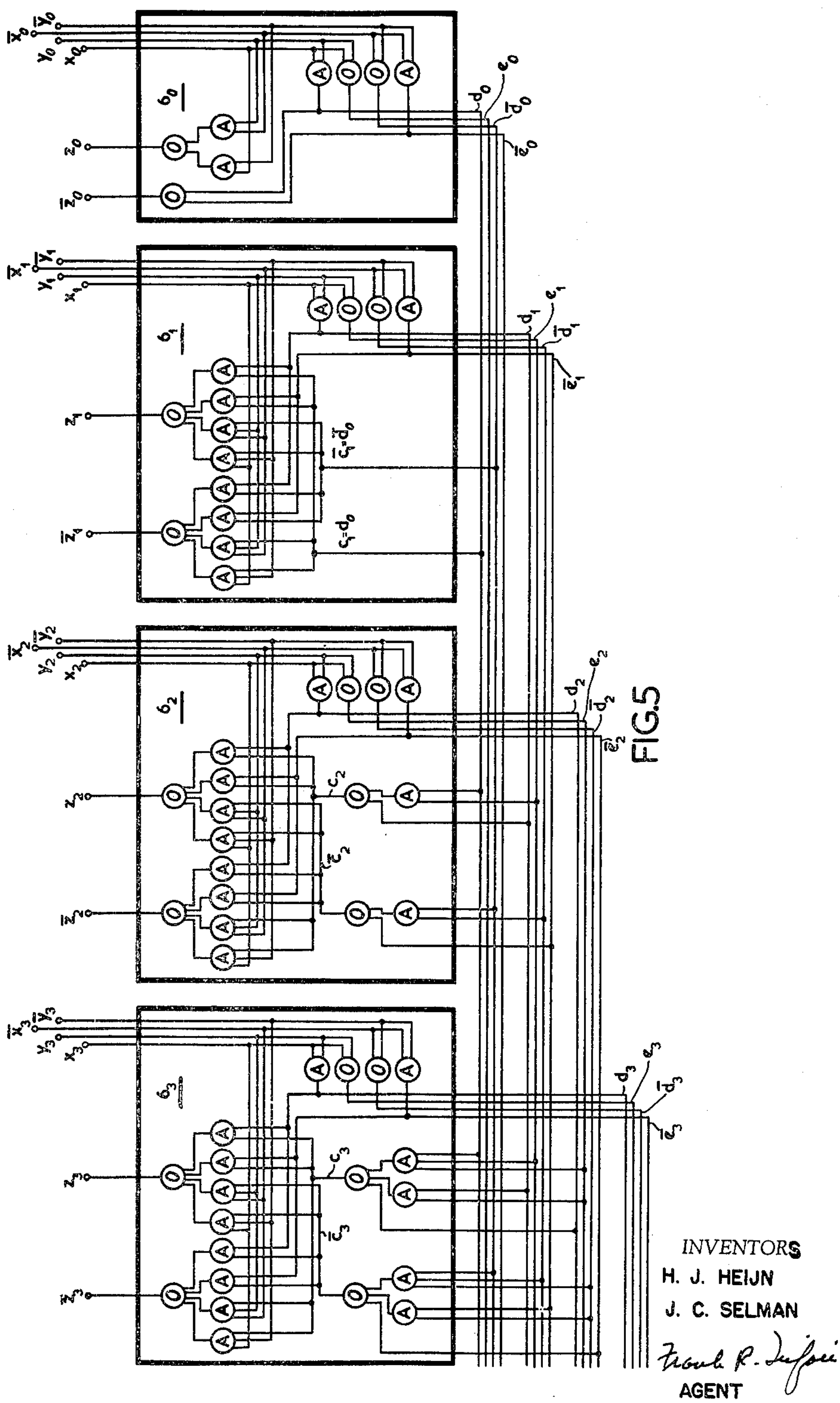
FIG. 5 shows the diagram of the first four sections of a high-speed adder according to the invention.

The first four sections of an adder based on these formulas are shown in FIG. 5. All digits $z_i$ ($i \geqq 2$) of the result are produced through five stages, except the first digit $z_0$ which is produced via two stages, except the first digit $z_1$ which is produced via three stages. Assuming that a gate can supply its output information 20 $n$ sec. (=20 $10^{-9}$ sec.) after receipt of its input information, an adder as shown in FIG. 5 can calculate, for any number of digit places, the sum of two binary numbers in 5.20 $n$ sec.=100 $n$ seconds.

As previously mentioned, this very high computing rate frequently cannot be utilized completely for reasons not relating to the adder. The adder may then be subdivided into sections each corresponding to more than one digit place and each section may be designed in the manner shown in FIG. 2, allowance having to be made of the fact that a carry must in certain cases traverse all digit places of a section. In this case, it is possible to follow two methods, viz.:

A. Each section is provided with an input carry-producer which traverses a small number of stages (three or two) and receives direct or indirect information about all digits $x_i$, $y_i$ preceding this section. These input carry-producers may be logical circuits of a type similar to those which, in the adder of FIG. 5, supply the information, $c_i$, $\bar{c}_i$ ($i \geqq 2$). All sections may then correspond to an equal number of digit places except the first, which, if desired, may comprise one digit place more due to the absence of an input carry-producer. The input-carry producers in this case operate simultaneously.

B. Each section is provided with an input carry-producer which traverses two or three stages and receives as input information/direct or indirect information about the digits $x_i$, $y_i$ of the section preceding this section, together with the information delivered by the preceding input carry-producer. In this case, each section must have one or two digit places less than the preceding section, since the input carry-producers now operate in series and it may occur that a carry traverses all input carry-producers.

Figure 6:
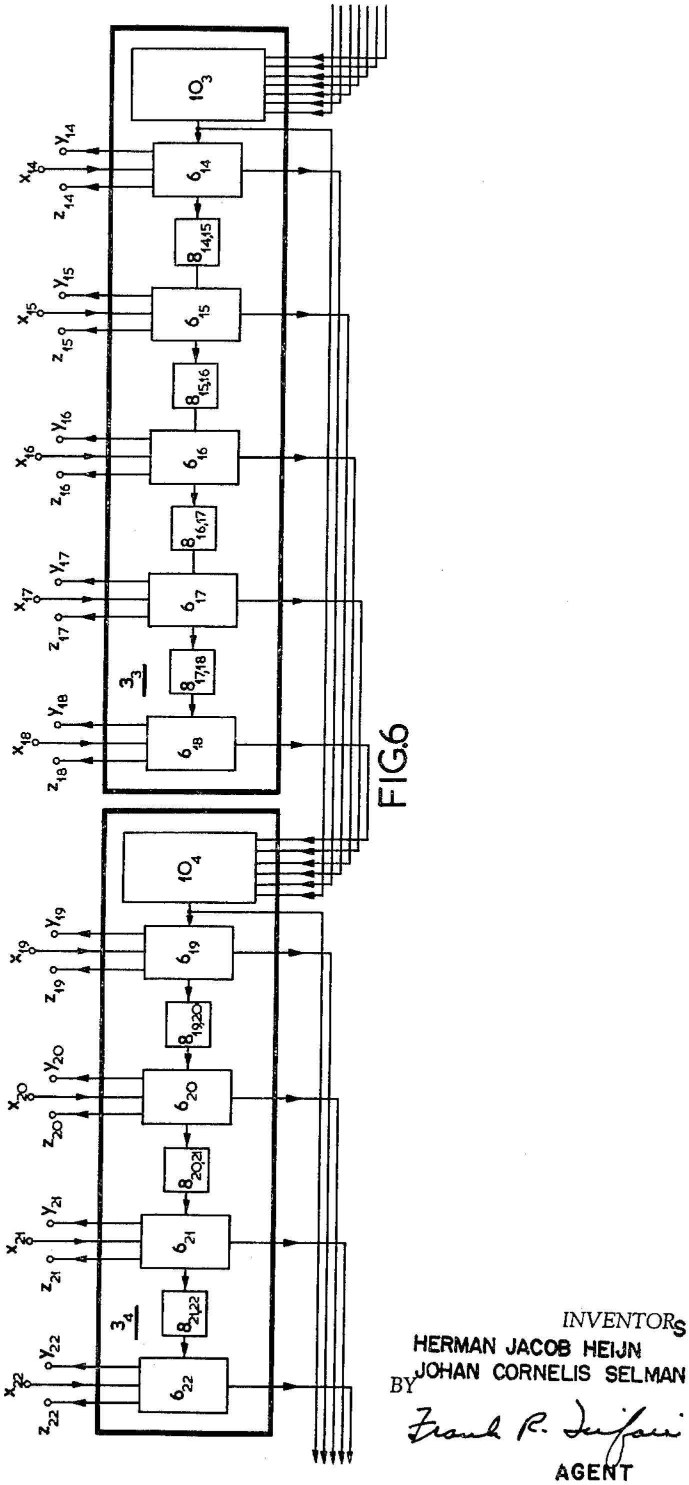
FIG. 6 shows the diagram of the third and fourth sections of another embodiment of an adder according to the invention.

FIG. 6 shows diagrammatically the structure of the third and the fourth section of an arithmetical element of the type B, the sections of which correspond successively to 8, 6, 5, 4, 3, 2, 1 digit places. The elementary full-adders $6_{14}$–$6_{22}$ and the carry producers $8_{14,\,15}$—$8_{17,\,18}$ and $8_{19,\,20}$—$8_{21,\,22}$ may each have the form shown in FIG. 3 or FIG. 4. Thus, each elementary full-adder $6_i$ receives $x_i$, $\bar{x}_i$, $\bar{y}_i$, $y_i$ as input information, but in the figure $x_i$ and $\bar{x}_i$, on the one hand, and $y_i$ and $\bar{y}_i$, on the other hand, are represented by a single line. If $\bar{x}_i$ and $\bar{y}_i$ are otherwise not available as direct information, this information may be produced from the information $x_i y_i$ by means of inverting gates. The elementary full-adders $6_i$ produce the information $z_i$ and $\bar{z}_i$ (the latter via an inverting gate, if desired), which is indicated again by a single line. The elementary full-adders $6_i$ also produce the indirect information $d_i=x_iy_i$, $e_i=x_i+y_i$, $\bar{d}_i=\bar{x}_i+\bar{y}_i$, $\bar{e}_i=\bar{x}_i\bar{y}_i$, for example in the manner shown in FIG. 5. In FIG. 6, these four kinds of indirect information are each represented by a single line. The section $3_3$ also comprises an input carry-producer $10_3$, which receives as input information the information $d_i$, $e_i$, $\bar{d}_i$, $\bar{e}_i$ ($i$=8, 9, 10, 11, 12, 13), together with the information $c_2=c_{7,8}$, $\bar{c}_2=\bar{c}_{7,8}$ produced by the preceding input carry-producer $10_2$. The input carry-producer $10_3$ produces therefrom the information $c_3=c_{13,14}$, $\bar{c}_3=\bar{c}_{13,14}$ about the input carry of the direct section. Similarly, the fourth section $3_4$ of the adder comprises an input carry-producer $10_4$, which receives as input information the information $d_i$, $e_i$, $\bar{d}_i$, $\bar{e}_i$ ($i$=14, 15, 16, 17, 18), together with the information $c_3=c_{13,14}$, $\bar{c}_{13,14}$ produced by the input carry-producer $10_3$, and which produces therefrom the information $c_4=c_{18,19}$, and $\bar{c}_4=\bar{c}_{18,19}$. Now, from the Formulas 11, it follows:

$$
\begin{aligned}
c_2&=d_7+e_7d_6+e_7e_6d_5+\ldots+e_7e_6e_5\ldots e_1d_0\\
\bar{c}_2&=\bar{e}_7+\bar{d}_7\bar{e}_6+\bar{d}_7\bar{d}_6\bar{e}_5+\ldots+\bar{d}_7\bar{d}_6\bar{d}_5\ldots\bar{d}_1\bar{d}_0\\
c_3&=d_{13}+e_{13}d_{12}+e_{13}e_{12}d_{11}+\ldots+e_{13}e_{12}e_{11}\ldots e_1d_0\\
\bar{c}_3&=\bar{e}_{13}+\bar{d}_{13}\bar{e}_{12}+\bar{d}_{13}\bar{d}_{12}\bar{e}_{11}+\ldots+\bar{d}_{13}\bar{d}_{12}\bar{d}_{11}\ldots\bar{d}_1\bar{d}_0
\end{aligned}
\tag{12}
$$

from which it can be deduced:

$$
\begin{aligned}
c_3&=d_{13}+e_{13}d_{12}+e_{13}e_{12}d_{11}+e_{13}e_{12}e_{11}d_{10}+e_{13}e_{12}e_{11}e_{10}d_9\\
&\quad+e_{13}e_{12}e_{11}e_{10}e_9d_8+e_{13}e_{12}e_{11}e_{10}e_9e_8c_2\\
\bar{c}_3&=\bar{e}_{13}+\bar{d}_{13}\bar{e}_{12}+\bar{d}_{13}\bar{d}_{12}\bar{e}_{11}+\bar{d}_{13}\bar{d}_{12}\bar{d}_{11}\bar{e}_{10}+\bar{d}_{13}\bar{d}_{12}\bar{d}_{11}\bar{d}_{10}\bar{e}_9\\
&\quad+\bar{d}_{13}\bar{d}_{12}\bar{d}_{11}\bar{d}_{10}\bar{d}_9\bar{e}_8+\bar{d}_{13}\bar{d}_{12}\bar{d}_{11}\bar{d}_{10}\bar{d}_9\bar{d}_8\bar{c}_2
\end{aligned}
\tag{13}
$$

Figure 7:
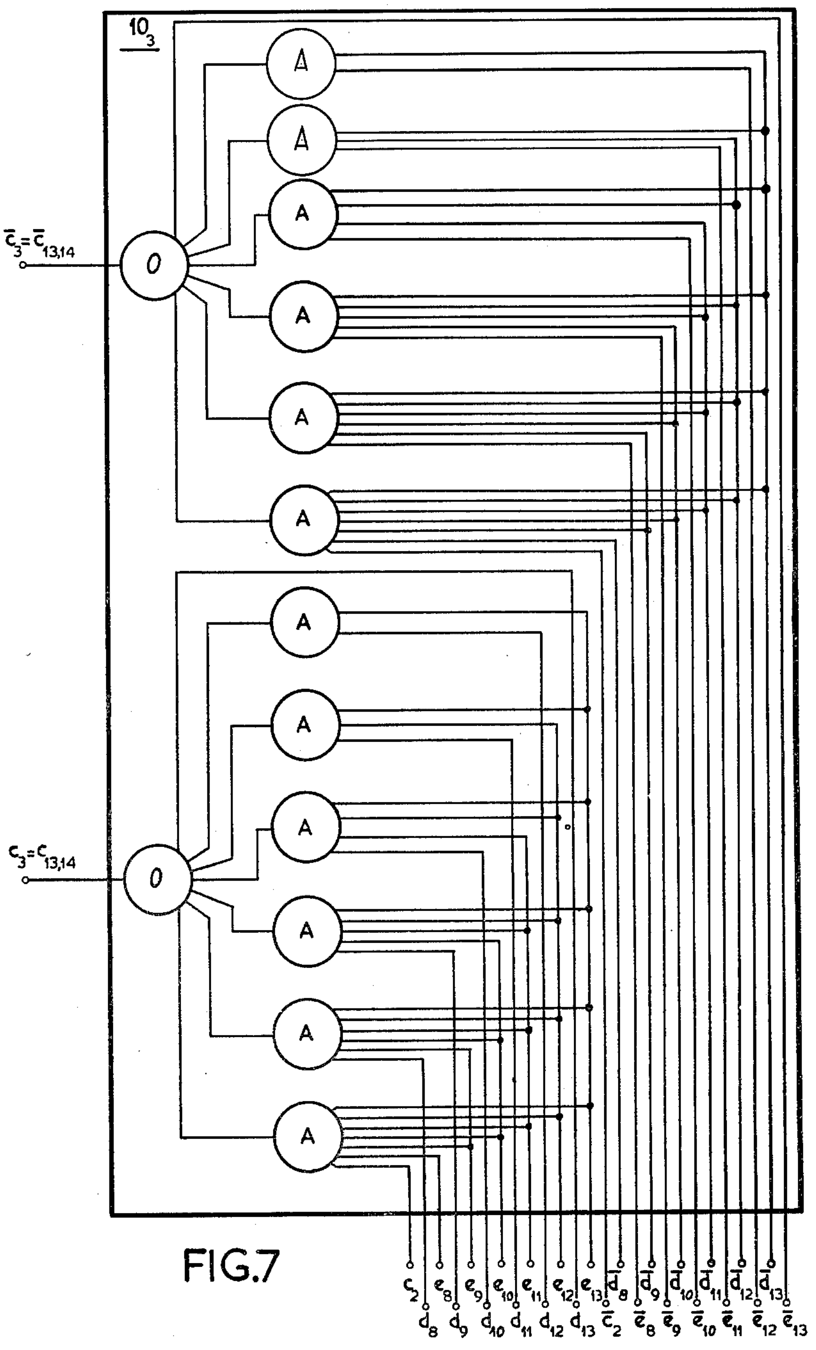
FIG. 7 shows the diagram of a detail of the adder of FIG. 6.

The diagram of an input carry-producer $10_3$ based upon these formulas is shown in FIG. 7. The input carry-producers $10_2$, $10_3$, $10_4$, $10_5$ thus supply their information via 3, 5, 7, 9,11 and 13 gates respectively so that the information about the end digits $z_7$, $z_{13}$, $z_{18}$, $z_{22}$, $z_{25}$, $z_{27}$, $z_{28}$ is produced via 16, 15, 15, 15, 15, 15 and 15 gates, respectively. If a gate can supply its output information 20 $n$ seconds after receipt of its input information, this adder calculates the sum of every two binary numbers of 28 digits in 16.20 $n$ sec.=320 $n$ sec.

We now assume that the adder co-acts with two registers, the bistable trigger circuits of which have a minimum change-over period of T $n$ sec., whilst each trigger circuit can supply its output information $T_2$ $n$ sec. after receipt of a change-over pulse. Assuming that the logical circuits $6_i$, $7_i$, $8_{i-1,i}$, $10_j$ are designed so that they can supply their output information ($z_i\bar{z}_i$; $z_i\bar{z}_i$; $c_{i-1,i}$, $\bar{c}_{i-1,i}$; $c_j$, $\bar{c}_j$) via 2, 1, 2, 2, gates respectively, whereas the input information $d_i$, $e_i$, $\bar{d}_i$, $\bar{e}_i$ of the members $10_j$ is produced via one gate. Assuming, finally, that $p$ is the rate at which each gate produces its output information. The number of digit places $a_1$ of the first section of the adder then must satisfy the condition $$T_1\geqq T_2+2a_1p$$

If, for example, $T_1$=1000 $n$ sec., $T_2$=500 $n$ sec., $p$=20 $n$ sec. then with a tolerance of 100 $n$ sec., it may be assumed that $a_1$=10. If $a_2$ is the number of digit places of the second section, then it is necessary that $$T_1\geqq T_2+2a_2p+3p$$

so that, for the same values of $T_1$, $T_2$ $p$ and with a tolerance of 80 $n$ sec., it is possible to assume $a_2$=9. If $a_3$ is the number of digit places of the third section, then it is necessary that $$T_1\geqq T_2+2a_3p+5p$$

so that, for the same values for $T_1$, $T_2$, $p$ and with a tolerance of 80 $n$ sec., it is possible to assume $a_2$=8. Progressing in this way, it is found that the adder can be subdivided into sections having successively 10, 9, 8, 7, 6, 5, 4, 3, 2, 1 digit places.

In quite a similar manner, it is possible to design a difference producer calculating the difference $z=x-y$. In this case, it is necessary to use the Boolean formulas $$
\begin{aligned}
z_i&=x_i\bar{y}_i\bar{c}_{i-1,i}+\bar{x}_i\bar{y}_i\bar{c}_{i-1,i}+\bar{x}_i\bar{y}_ic_{i-1,i}+x_iy_ic_{i-1,i}\\
\bar{z}_i&=\bar{x}_iy_ic_{i-1,i}+x_i\bar{y}_ic_{i-1,i}+x_iy_i\bar{c}_{i-1,i}+\bar{x}_i\bar{y}_i\bar{c}_{i-1,i}\\
c_{i-1,i}&=\bar{x}_{i-1}y_{i-1}c_{i-2,i-1}+\bar{x}_{i-1}\bar{y}_{i-1}c_{i-2,i-1}\\
&\quad+\bar{x}_{i-1}y_{i-1}\bar{c}_{i-2,i-1}+x_{i-1}y_{i-1}c_{i-2,i-1}\\
\bar{c}_{i-1,i}&=x_{i-1}\bar{y}_{i-1}\bar{c}_{i-2,i-1}+x_{i-1}y_{i-1}\bar{c}_{i-2,i-1}\\
&\quad+x_{i-1}\bar{y}_{i-1}c_{i-2,i-1}+\bar{x}_{i-1}\bar{y}_{i-1}\bar{c}_{i-2,i-1}
\end{aligned}
\tag{14}
$$

The construction of a multiplicator or divider according to the invention gives rise, without further inventions, to highly complicated and thus unpractical structures. However, the invention may be successfully applied to an arithmetic element which performs an operation less complicated than multiplication or division and which also apparently has the character of a series-process due to the presence of propagating carries. Such an arithmetic element may be very practical to supply extremely rapidly intermediate results for producing products, quotients, etc., and thus a means for calculating products, quotients, etc. more rapidly than by repeated additions or subtractions.

What is claimed is:

1. An arithmetic element for performing the addition of two numbers $x$ and $y$ in the binary system comprising means for applying input electrical pulses to the element, said pulses representing the binary digits $x_i$ and $y_i$ of the two numbers $x$ and $y$, said arithmetic element being subdivided into sections, each section corresponding to a plurality of digit places of the numbers $x$ and $y$, each said section comprising a first plurality of and- and or-gates, said first plurality of gates being connected to be responsive to said input pulses to sequentially produce first auxiliary pulses representing first auxiliary information $d_i=x_iy_i$ and $e_i=x_i+y_i$, each said section further comprising a second plurality of and- and or-gates, said second plurality being connected to be responsive to said first auxiliary pulses to sequentially produce carry pulses representing carries of an addition operation and satisfying $c_{i,i+1}=d_i+e_ic_{i-1,i}$, each said section being preceded by an input-carry producer, means for applying to said input-carry producer second auxiliary pulses from the next preceding section representing second auxiliary information $d_q$, $d_{q+1}$, . . . , $d_p$, $e_q$, $e_{q+1}$, . . . $e_p$, wherein $q$ is the order of the first and $p$ is the order of the last digit place of the next preceding section and means for applying to said input-carry producer carry pulses from the carry producer of the next preceding section representing the carry $c_{q-1,q}$, each input-carry producer comprising a plurality of and- and or-gates to which are applied said second auxiliary pulses and said carry pulses, the and- and or-gates of each carry producer producing simultaneously carry pulses at its output, each input-carry producer output being connected to the lowest order digit place of its succeeding section.

2. An arithmetic element according to claim 1, wherein each section corresponds to a plurality of digit places less in number than the next preceding section.

3. A high-speed adder for adding pulses corresponding to the operands of plural-order binary numbers, comprising means for registering the pulses representing the respective order operand digits of said numbers, means for applying said pulses to said adder, said adder being divided into a plurality of sections, each section having a plurality of adding elements corresponding to a plurality of successive orders of said operands, each section except the one corresponding to the lowest order of said binary numbers being preceded by an input-carry producer, means in each section operating to produce sequentially the sum of the pulses applied to said section, the output of the input-carry producer of each section being coupled to the input of the lowest order adding element of said section and also to the input of the input-carry producer of the immediately succeeding section, the inputs of the input-carry producer of each section being coupled to the outputs of the individual adding elements of the immediately preceding section and the output of the input-carry producer thereof, and means in each input-carry producer operating to produce simultaneously an output independent of the sequential carries of the individual adding elements in the immediately preceding section.

4. An adder according to claim 3, wherein each section corresponds to a plurality of digit places less in number than the next preceding section.

References Cited in the file of this patent

UNITED STATES PATENTS

| | | |
|---|---|---|
| 2,719,670 | Jacobs et. al. | Oct. 4, 1955 |
| 2,803,401 | Nelson | Aug. 20, 1957 |
| 2,815,913 | Lucas | Dec. 10, 1957 |
| 2,819,839 | Jacobs et al. | Jan. 14, 1958 |
| 2,879,001 | Weinberger et al. | Mar. 24, 1959 |
| 2,954,168 | Maddox | Sept. 27, 1960 |